(12) United States Patent
Wallner et al.

(10) Patent No.: US 9,147,139 B2
(45) Date of Patent: Sep. 29, 2015

(54) METHOD AND SYSTEM TO PROCESS COLOR PRINT IMAGES FOR DIGITAL PRINTING

(71) Applicants: Robert Wallner, Neuried (DE); Oliver Hoffmann, Isen (DE)

(72) Inventors: Robert Wallner, Neuried (DE); Oliver Hoffmann, Isen (DE)

(73) Assignee: Océ Printing Systems GmbH & CO. KG, Poing (DE)

( * ) Notice: Subject to any disclaimer, the term of this patent is extended or adjusted under 35 U.S.C. 154(b) by 0 days.

(21) Appl. No.: 14/191,537

(22) Filed: Feb. 27, 2014

(65) Prior Publication Data

US 2014/0240729 A1    Aug. 28, 2014

(30) Foreign Application Priority Data

Feb. 27, 2013 (DE) .................... 10 2013 101 923

(51) Int. Cl.
  *H04N 1/46* (2006.01)
  *G06K 15/02* (2006.01)
  *G06T 1/00* (2006.01)
  *G06F 3/12* (2006.01)

(52) U.S. Cl.
  CPC .......... *G06K 15/1878* (2013.01); *G06F 3/1208* (2013.01); *G06F 3/1256* (2013.01); *G06F 3/1288* (2013.01); *G06T 1/00* (2013.01)

(58) Field of Classification Search
  None
  See application file for complete search history.

(56) References Cited

U.S. PATENT DOCUMENTS

| 5,260,777 | A |   | 11/1993 | Komine et al. |
| 5,309,257 | A | * | 5/1994 | Bonino et al. ................ 358/504 |
| 5,513,300 | A | * | 4/1996 | Shibazaki .................... 358/1.13 |
| 5,602,970 | A | * | 2/1997 | Janser ........................... 358/1.9 |
| 5,734,799 | A | * | 3/1998 | Kusumoto et al. ............ 358/1.6 |
| 6,590,724 | B2 | * | 7/2003 | Togino ......................... 359/833 |
| 7,525,685 | B2 | * | 4/2009 | Maniam et al. ................ 358/1.9 |
| 8,149,456 | B2 | * | 4/2012 | Fan et al. ....................... 358/1.9 |
| 8,159,720 | B2 | * | 4/2012 | Fan .............................. 358/3.06 |
| 8,164,766 | B2 |   | 4/2012 | van de Capelle et al. |
| 2001/0033440 | A1 | * | 10/2001 | Togino ......................... 359/883 |
| 2006/0227380 | A1 | * | 10/2006 | Fan .............................. 358/3.03 |
| 2009/0003696 | A1 | * | 1/2009 | Ishii et al. .................... 382/167 |
| 2013/0194637 | A1 | * | 8/2013 | Takemoto et al. ........... 358/3.32 |

* cited by examiner

*Primary Examiner* — Dung Tran
(74) *Attorney, Agent, or Firm* — Schiff Hardin LLP

(57) ABSTRACT

In a method or system for processing a color print image for digital printing at a predetermined printing apparatus, the print image is deconstructed into color separations according to characteristic color curves of the printing apparatus. The color separations are stored in a data unit as greyscale bitmap images and at least one of a color code and color values are associated with each color separation in the data unit. The print image encoded in the data unit is presented at a display device for monitoring or management before printout at the printing apparatus, the print image being presented at the display device by means of at least one of the color code and color values associated with the respective color separations such that the individual color separations are transparently superimposed.

15 Claims, 4 Drawing Sheets

METHOD AND SYSTEM TO PROCESS COLOR PRINT IMAGES FOR DIGITAL PRINTING

BACKGROUND

The disclosure concerns a method and a system to process color print images for digital printing. Relative to offset printing, digital printing is distinguished by a high flexibility since, in digital printing, it is possible to print different print images in succession. In contrast to this, in offset printing a defined print image is repeatedly printed with a predetermined print run.

It is known to review (and, if applicable, to correct) digital print data before the printing process with a preflight software. In particular, a check is hereby made as to whether the print data are correctly formatted and correspond to the corresponding data type for the printing process. In particular, a check is made as to whether all data can be accessed; whether all fonts are activated; whether the color spaces are correctly assigned; whether the lines/contours are vectorized or pixelated; whether the print data possess the required resolution; whether the correct spot colors are included in the document; and whether the trapping is correct. This preflight method is used similarly both for offset printing and for digital printing.

The processing of print images in offset printing differs from that in digital printing in that the print images are deconstructed into color separations in offset printing. The individual color separations represent greyscale bitmap images. Offset printing plates for the offset printing are generated using the color separations by means of an exposer. The offset printing plates serve to transfer a defined colorant onto a recording medium.

In digital printing, as a matter of principle the translation of the color values of the print data into the colors of the print groups of the printing apparatus takes place completely differently. The print data can include characteristic color curves for the individual color objects. At the print server associated with the digital printing apparatus, or in the control device of the digital printing apparatus, these are then compared with the characteristic curves of the print colors of the printing apparatus and converted accordingly. Alternatively, the print data are represented with standardized color spaces (for example CMYK, RGB, LAB), and rule-based color corrections are implemented in the preflight method (at the print server or in the control device of the printing apparatus) in order to convert the standardized colors into the print colors of the printing apparatus. The deconstruction of the print data into the individual print colors only takes place immediately before the rastering or in the rastering of the print data. The rastered print data are then relayed directly to the respective print heads of the digital printing apparatus.

Digital printing is more flexible than offset printing. However, the quality of offset printing is normally better than that of digital printing. One of the reasons for this is that the print colors are normally more precisely adjustable in offset printing than in digital printing.

SUMMARY

It is an object to achieve a method and a system to process color print images for digital printing with which the high flexibility of digital printing is maintained on the one hand, and on the other hand the control over the color correctness of the printed colors is improved.

In a method or system for processing a color print image for digital printing at a predetermined printing apparatus, the print image is deconstructed into color separations according to characteristic color curves of the printing apparatus. The color separations are stored in a data unit as greyscale bitmap images and at least one of a color code and color values are associated with each color separation in the data unit. The print image encoded in the data unit is presented at a display device for monitoring or management before printout at the printing apparatus, the print image being presented at the display device by means of at least one of the color code and color values associated with the respective color separations such that the individual color separations are transparently superimposed.

DESCRIPTION OF EXEMPLARY EMBODIMENTS

Figure 1:
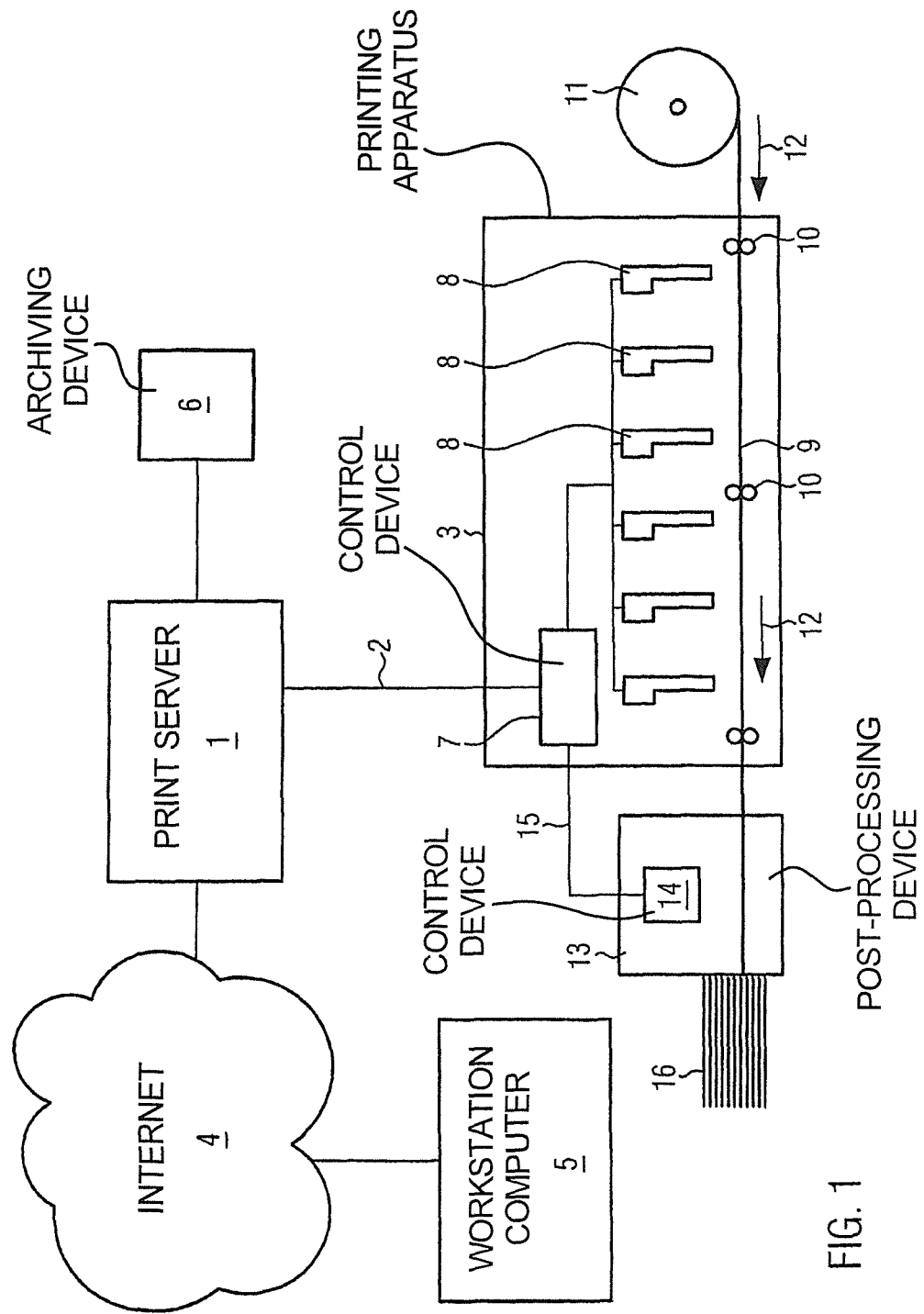
FIG. 1 illustrates schematically in a block diagram a system to execute the method according to the exemplary embodiment.

For the purposes of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

A method according to the exemplary embodiment for processing of color print images for digital printing at a predetermined printing apparatus includes the following steps:

a) deconstruct a print image into color separations according to characteristic color curves of the printing apparatus, b) store the color separations in a data unit as greyscale bitmap images, and c) associate a color code and/or color values with each color separation of the data unit.

For the first time, with the method according to an exemplary embodiment print images for digital printing are decomposed into color separations according to the characteristic color curves of the printing apparatus. These color separations are stored in the data unit as separate greyscale bitmap images. Via the association of a color code and/or of color values with each color separation of the data unit, it is possible that the print image (subdivided into multiple color separations in the data unit) can be represented with a conventional display device using the color values or the color code. The full flexibility of the digital printing is hereby achieved since, at every processing point in time, it is possible to make the print image visible at a display device, be it for additional processing or for monitoring.

On the other hand, a unique association of the colors to be printed—which can be established by a user in an arbitrary early stage of the processing of the print data—takes place via the deconstruction of the print image into the color separations. For this, the colors available to the printing apparatus or their characteristic color curves only need to be known.

With the exemplary embodiment, for the first time a data unit is achieved that includes all color separations of a print image and with which color codes and/or color values are simultaneously associated. The data unit is typically a file. The color codes and/or color values can be included in the file. However, it is also possible that the color code and/or color values are stored in a separate job ticket.

Color values are numerical values that describe the colors of the individual color separations using a predetermined (advantageously standardized) color space, for example CMYK, RGB, LAB. The color codes are color identifications, for example names (red, green, blue, magenta, yellow) that describe colors. The color codes are advantageously the names of the defined print colors used in the printing apparatus. Using the color code, the printing apparatus can simply associate the individual color separations with the colorants in the individual print groups, and therefore with the print groups themselves. Given spot colors, very specific names—for example "OCÉ Red"—can also be used.

Since both the color codes and the color values describe the colors of the respective color separation, the color code and color values can be uniquely associated with one another. Therefore, in principle it is sufficient to merely provide color codes or color values that are then converted accordingly as needed. However, in practice it is advantageous to provide both color codes (that correspond to the color codes used in the printing apparatus for the respective colors) and color values that can be read by display devices and be represented accordingly. Given the representation of the color separations at a display device, these are transparently superimposed.

A print order is advantageously associated with the data unit including the color separations is advantageous since, given a deviating print order, a different print image can result due to the different transparency properties of the individual print colors.

The data unit including the print image is transmitted to the printing apparatus, which has multiple color print groups or print heads which respectively print a predetermined color with a defined colorant. Using the color codes, the printing apparatus associates the individual color separations with a respective one of the color print groups or print heads and prints the respective color separation onto a recording medium at this color print group or print head. Since the color separations are uniquely associated with a defined print color of the printing apparatus, no color correction takes place at the printing apparatus. The methods known from digital printing for conversion or correction of the color values are thus superfluous. Rather, such corrections would adulterate the print image in the method according to the exemplary embodiment. Given the deconstruction of the print image into the color separations, the unique association of the color separations into the print colors takes place, whereby an exact control and adjustment of the colors of the printed print image is enabled given the deconstruction of the print image into the color separations. The reliability of the reproduction of the colors on the recording medium is hereby significantly increased.

An additional advantage of the exemplary embodiment lies in that the tools for pre-processing and preparation of the print data for offset printing can also be used for digital printing. The workflow in the pre-processing and preparation of the print data up to the deconstruction of the print image into color separations thus coincides for offset printing and digital printing. Only different characteristic color curves are to be used in the deconstruction of the print image into the color separations.

Before the deconstruction of the print image into the individual color separations, this can be subjected to a color processing (color management) as it is known from the prior art.

The print data include at least the data unit with the individual color separations, the color codes and/or the color values. The print data are advantageously kept ready at the printing apparatus and at a post-processing device (which is possibly present) and associated with the recording medium printed with the print data, such that a post-processing of the recording medium can be controlled by means of the print data.

The print data are advantageously archived after the printing of a recording medium. Since the print data can be directly depicted at a display device by means of the color values or the color code, these can be viewed later at any time.

The exemplary embodiment also includes a system to execute the method explained above. This system advantageously has a print server at which is stored and executable a computer program to: deconstruct a print image into color separations according to characteristic color curves of the print apparatus; store the color separations in a data unit as greyscale bitmap images; and associate a color code and/or color values with each color separation of the data unit; wherein the print server is connected with the printing apparatus so that the data unit can be transferred to the printing apparatus in order to be printed out there onto a recording medium.

Furthermore, the exemplary embodiment includes a computer program product that is designed to execute one of the methods explained above.

An exemplary embodiment is explained in detail as an example in the following using the drawing figures.

The exemplary embodiment concerns a method to process color print images for digital printing. Such a method can be executed at a print server 1 (FIG. 1). The print server 1 is connected with a printing apparatus 3 via a data line 2. Workstation computers 5 at which print images are generated by users for output to a printing apparatus can be connected to the print server 1 via a local network (LAN) or a wide area network (for example the Internet 4).

Furthermore, the print server 1 is connected with an archiving device 6 to archive data.

The printing apparatus 3 has a control device 7 which receives print data from the print server 1, prepares the print data and relays the print data to one or more color print groups or print heads 8. The color print groups or print heads 8 are arranged adjacent to a transport path of a recording medium 9 so that they can apply print color to the recording medium 9. The transport path of the recording medium 9 is directed by means of rollers 10.

In the present exemplary embodiment, in the printing apparatus the recording medium (which is normally paper) is removed from a recording medium roll 11 and fed in the transport direction 12.

In the transport direction 12, a post-processing device 13 is arranged after the printing apparatus 3. In the present exemplary embodiment, the post-processing device 13 is a cutting device that cuts the continuous recording medium 8 into individual sheets and stacks them. Additional post-processing devices (for example an enveloping device) can alternatively or additionally be provided. The post-processing device 13 has a control device 14 that is connected with the control device 7 of the printing apparatus 3 or a data line 15.

The print heads 8 are inkjet print heads that apply ink onto the recording medium 9 as a print color. Instead of inkjet print heads, however, electrophotographic print heads can also be provided that apply color toner onto the recording medium 9. In principle, this method is suitable for any arbitrary color printing method with multiple color print groups, for example even a recently developed method with liquid toner.

Figure 2:
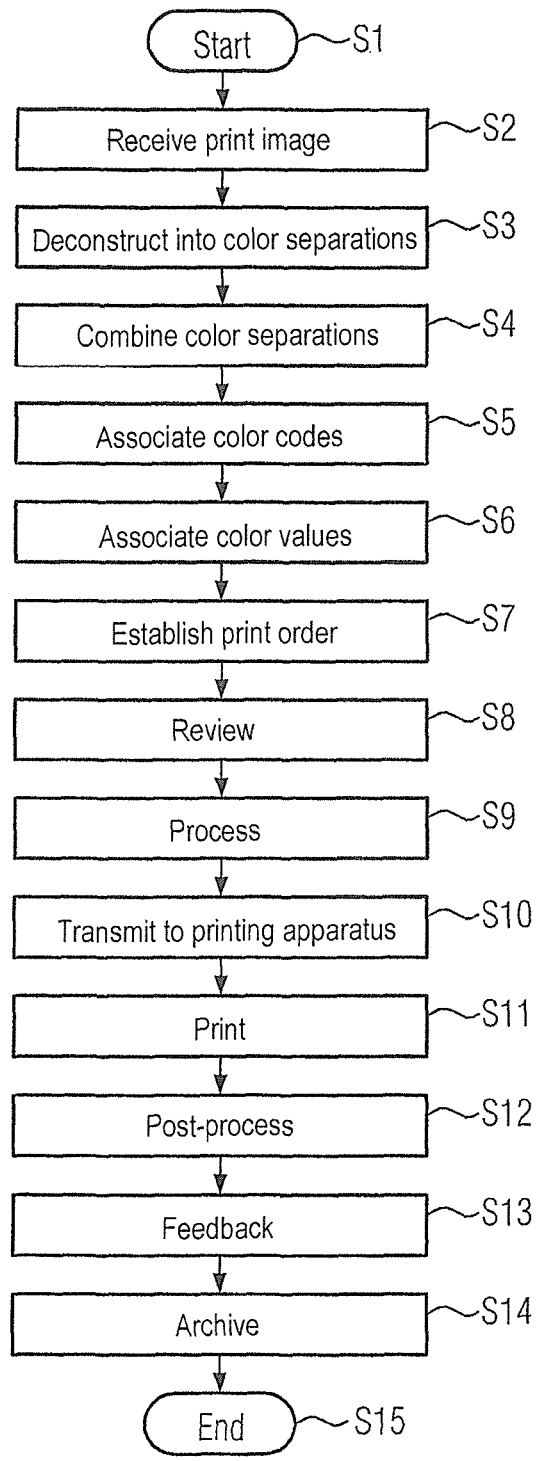
FIG. 2 is an exemplary embodiment of the method in a flow chart.

A print image generated at the workstation computer 5 is transmitted to a print server 1 via the Internet 4. A significant portion of a method to process color print images for digital printing is executed at the print server 1, as is explained in detail in the following using FIG. 2.

The method begins with Step S1. In Step S2, the print image is received at the print server 1.

In Step S3, the color print image is deconstructed in multiple color separations. The deconstruction of the color separations 17 takes place using characteristic color curves of the print colors provided at the respective print heads 8. The color separations are greyscale bitmap images. The color separations can be stored in any lossless image format for greyscale bitmap images. In the present exemplary embodiment, TIFF files with an 8-bit greyscale or a 4-bit greyscale are used. The separation into the individual color separations takes place according to the method inherently known from offset printing.

Figure 3A:
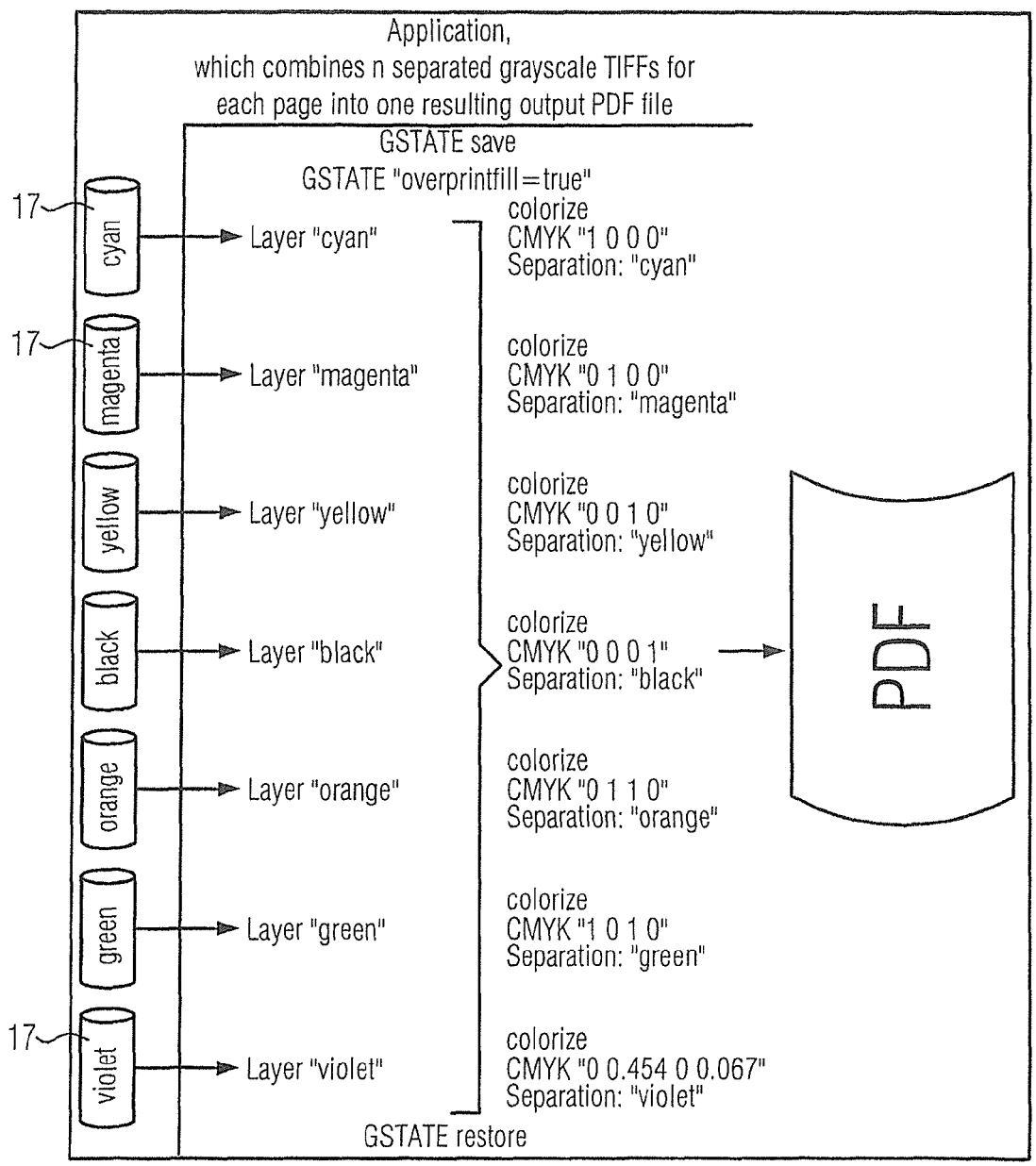
FIGS. 3a and 3b respectively illustrate schematically a content of a data unit with multiple color separations.

FIG. 3a schematically shows an exemplary embodiment with seven color separations 17 in the colors cyan, magenta, yellow, black, orange, green and violet. The colors cyan, magenta, yellow and black are designated as process colors, and the additional colors orange, green and violet are designated as spot colors or special colors. The process colors span a predetermined color space (here CMYK) with which all colors of this color space can be depicted, in principle. The spot colors are special colors. In the individual applications, the spot colors normally deviate significantly from one another, both in number and in color tone. With the spot colors, the specific color tone of the spot color should be printable in the print image with a high color saturation.

In Step S4, the individual color separations 17 are assembled into a data unit. In the present exemplary embodiment, this is executed in that the color separations 17 of the predetermined colors in the form of TIFF files are combined into a single file. The individual color separations are hereby positioned exactly atop one another. This means that coordinate information regarding the individual color separations is included in the file, such that a unique association of the respective color separation is present in a print plane. The color separations are adopted into the file without modification.

A color code (Step S5) and color values (Step S6) are respectively associated with the color separations. In the present exemplary embodiment, the color codes are the English designations of the respective color with which the color separations are associated, and the color values are indicated in the CMYK color space. The corresponding data are listed in the following table:

| Color separation | Color code | Color values (CMYK) |
|---|---|---|
| Cyan | Cyan | 1 0 0 0 |
| Magenta | Magenta | 0 1 0 0 |
| Yellow | Yellow | 0 0 1 0 |
| Black | Black | 0 0 0 1 |
| Orange | Orange | 0 1 1 0 |
| Green | Green | 1 0 1 0 |
| Violet | Violet | 0 0.454 0 0.067 |

The color codes and color values can be stored in the data unit, for example the PDF file. The print data also advantageously include a job ticket in which control values for the printing process are stored. Given the presence of a job ticket, it is advantageous to store the color code and the color values in the job ticket. The print data can also include a job ticket and multiple data units with respective separate color separations. In such a case, the corresponding color codes and color values are stored in the job ticket for each data unit.

In the present data unit, all color separations are defined as transparent (GSTATE "overprint fill=true").

The print order is then established automatically (Step S7) according to predetermined rules. For example, lighter colors can hereby be printed before darker colors. The print order is stored in the print data. In the print apparatuses, the print order is for the most part established by the arrangement of the print heads. Therefore, the print order stored in the print data is used as a recommendation (that is not necessarily to be complied with), wherein an operator of a printing apparatus has to decide whether the recommended print order is complied with in the printing.

The print data are presented at a display device (for example an LCD monitor) to review the print data (Step S8). The individual color separations are hereby converted by means of the color values into corresponding color values of the display device (which are typically RGB values), superimposed and output to the display device. This is a color-similar presentation relative to the later printout, since a perfect conversion at the display device is difficult to accomplish. Therefore, the color values of the individual color separations are also designated as replacement colors since they allow a similar (but not always identical) presentation at a display device.

The print data can be processed, wherein the print image is modified (Step S9). Given such a processing, for example, print markings are set, a barcode is inserted or the content of the print image is personalized. It can hereby be advantageous that individual color separations are masked out or only a single color separation is presented at the display device. The processing of the print data advantageously takes place in a single color separation, in particular in the color separation of the color black.

The reviewed and processed print data are transmitted from the print server 1 to the control device 7 of the printing apparatus 3 (Step S10).

Using the color code, the control device 7 associates the individual color separations with a respective color print group or print head 8 and transmits the corresponding color separation to the color print group 8 in order to apply the corresponding colorant onto the recording medium. There are print heads that, for example, can print a 4-bit greyscale depth or 4-bit color depth without additional pre-processing. If the greyscale depth of the color separations coincides with those that can be directly translated by the color print group, the individual color separations 17 can thus be supplied to the corresponding print heads 8 without additional processing. If the greyscale depth of the color print group is smaller (2-bit, for example) than the greyscale depth of the color separations (8-bit, for example), the individual color separations are accordingly rastered in the control device 7, and only then are they transmitted to the corresponding color print group 8.

The print heads 8 apply the colorant to the recording medium 9 (Step S11) corresponding to their activation by means of the color separations 17.

The printed recording medium 9 is conveyed further in the transport direction 12 to the post-processing device 13. In the post-processing device, the recording medium is cut into individual sheets 16 and the individual sheets 16 are stacked atop one another (Step S12). For this, the print data are transmitted from the control device 7 of the printing apparatus 3 to the control device 14 in the post-processing device 13.

If the processing of the recording medium with the corresponding print data has concluded, the control device 14 of the post-processing device 13 generates a feedback to the control device 7 of the printing apparatus 3, wherein this feedback is relayed to the print server 1. If it is established at the print server 1 that defined print data have been completely processed, the print data are then transmitted to the archiving device 6 to archive them (Step S14). Since the print data can be shown at a display device at any time using the color values, they can be presented again at an arbitrary display device at an arbitrary later point in time. The unique association of the color separations with the print colors is present at the same time, such that an exact reprinting is possible at any time.

The archiving of the print data can also take place at any other point in time of the method, in particular even immediately after their production.

Within the scope of the exemplary embodiment, it is possible to simultaneously print the print data at multiple printing apparatuses that have the same characteristic color curves. A higher throughput is hereby achieved. This applies both to the first printing and to a reprinting with the aid of the archived print data.

This shows that, given the method according to the exemplary embodiment, the flexibility of digital printing is optimally combined with the color association known from offset printing. This is achieved via the provision of a data unit with the multiple color separations 17 and the color codes or color values associated with the color separations.

After archiving, the method ends with Step S15.

The color print images processed according to the exemplary embodiment can be printed with high performance since no color correction whatsoever must be executed at the printing apparatus itself. Instead, here it is no longer desired at all.

Figure 3B:
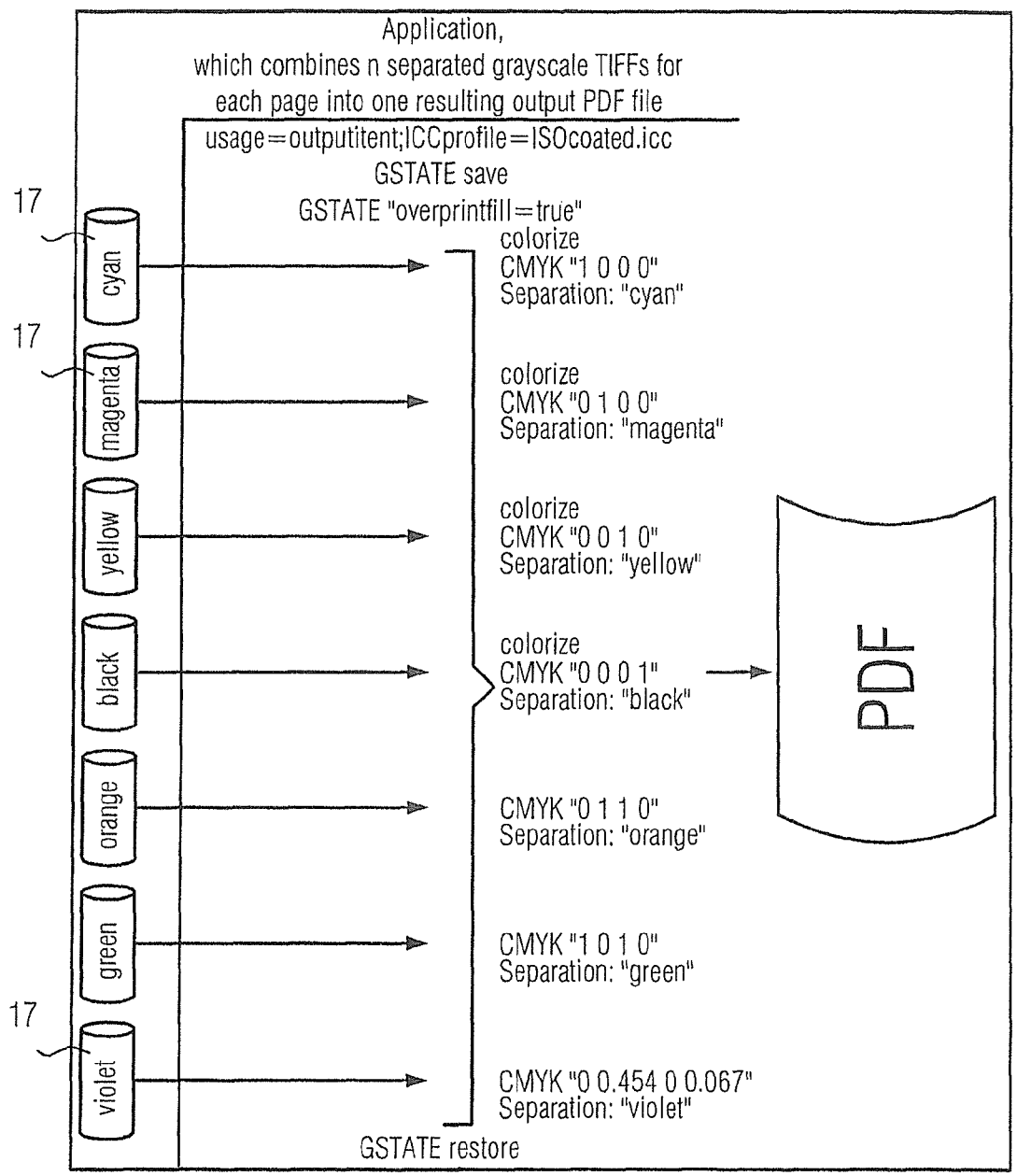

FIG. 3b shows an alternative embodiment of the data unit in which the individual color separations are stored in a PDF file off the PDF/X-4 format. In this method, what is known as an Output Intent is defined with the ICC profile "ISOcoated.icc". The transparencies are standardized in this file format.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A method for processing a color print image for digital printing at a respective predetermined printing apparatus, comprising the steps of:
    deconstructing the print image into individual color separations according to characteristic color curves of the respective predetermined printing apparatus;
    storing the individual color separations in a data unit as greyscale bitmap images and associating at least one of a color code and color values with each color separation in the data unit; and
    presenting the print image based on the color separations in the data unit at a display device for monitoring or management before printout at the respective predetermined printing apparatus, the print image being presented at the display device by means of at least one of the color code and the color values associated with the respective color separations such that the individual color separations are transparently superimposed.

2. The method according to claim 1 wherein a print order is associated with the color separations.

3. The method according to claim 1 wherein the data unit including the print image is transmitted to the printing apparatus which has multiple color print groups which respectively print a predetermined color, the printing apparatus associating the individual color separations with a respective one of the color print groups using at least one of the color code and the color values, and prints the respective color separation onto a recording medium at said color print group.

4. The method according to claim 3 wherein no color correction of the print data takes place in the printing apparatus.

5. The method according to claim 1 wherein the print image is subjected to a color management before the deconstructing of the print image into the color separations.

6. The method according to claim 1 wherein at least one of the color code and the color values are stored in a job ticket, the job ticket being associated with the data unit.

7. The method according to claim 3 wherein print data includes at least the data unit and at least one of the color code and the color values, and the print data are kept ready at the printing apparatus and at a post-processing device, and are associated with the recording medium printed with the print data, a post-processing of the recording medium being controlled by means of the print data.

8. The method according to claim 3 wherein print data includes at least the data unit and at least one of the color code and the color values of a recording medium, and said print data being archived.

9. The method according to claim 1 wherein the data unit is printed at multiple printing apparatuses with same characteristic color curves.

10. A system for processing a color print image for digital printing at a respective predetermined printing apparatus, comprising:
    a deconstructing device which deconstructs the print image into individual color separations according to characteristic color curves of the respective predetermined printing apparatus;
    a storage device which stores the color separations in a data unit as greyscale bitmap images;
    an association device which associates at least one of a color code and color values with each color separation in the data unit; and
    a display device which presents the print image based on the color separations in the data unit for monitoring or management before printout at the respective predetermined printing apparatus, the print image being presented at the display device by means of at least one of the color code and the color values associated with the respective color separations such that the individual color separations are transparently superimposed.

11. The system of claim 10 further including an association device which associates a print order with the color separations.

12. The system of claim 10 wherein said deconstructing device, said storage device, and said association device comprise a print server at which is stored and executed a computer program on a tangible computer readable medium, said program performing said deconstructing of said print image into said color separations according to said characteristic color curves of the print apparatus, storing the color separations of the data unit as said greyscale bitmap images, and associating the said at least one of said color code and said color values with each said color separation of the data unit, and wherein the print server is connected with the printing apparatus so that the data unit is transferred to the printing apparatus in order to be printed out there onto a recording medium.

13. A tangible non-transitory computer readable medium for use in processing a color print image for digital printing at a respective predetermined printing apparatus, said tangible non-transitory computer readable medium comprising a computer program for performing the steps of:
  deconstructing the print image into individual color separations according to characteristic color curves of the respective predetermined printing apparatus;
  storing the individual color separations in a data unit as greyscale bitmap images and associating at least one of a color code and color values with each color separation in the data unit; and
  presenting the print image based on the color separations in the data unit at a display device for monitoring or management before printout at the printing apparatus, the print image being presented at the display device by means of at least one of the color code and the color values associated with the respective color separations such that the individual color separations are transparently superimposed.

14. The system of claim 12 wherein no color correction of the print data takes place in the printing apparatus.

15. The tangible non-transitory computer readable medium of claim 13 wherein no color correction of the print data takes place in the printing apparatus.

* * * * *